United States Patent [19]

Schabacher et al.

[11] 3,878,294

[45] Apr. 15, 1975

[54] PRODUCTION OF HYDROGEN FLUORIDE

[75] Inventors: Werner Schabacher, Leverkusen;
Hans Guth, Bergisch Neukirchen;
Hermann Rohe, Leverkusen;
Wolfgang Keller, Bergisch
Gladbach-Paffrath, all of Germany

[73] Assignee: Bayer Aktiengesellschaft,
Leverkusen, Germany

[22] Filed: Dec. 19, 1973

[21] Appl. No.: 426,423

Related U.S. Application Data

[63] Continuation of Ser. No. 219,376, Jan. 20, 1972, abandoned.

[30] Foreign Application Priority Data

Jan. 26, 1971 Germany............................ 2103338

[52] U.S. Cl. ................ 423/485; 423/166; 423/483; 423/484; 423/555
[51] Int. Cl. .......................... C01b 7/33; C01f 4/16
[58] Field of Search ........... 423/485, 483, 484, 166, 423/555

[56] References Cited
UNITED STATES PATENTS

| | | | |
|---|---|---|---|
| 2,222,385 | 11/1940 | Washburn et al................... | 423/555 |
| 2,655,430 | 10/1953 | Schiermeir........................ | 423/555 |
| 2,959,466 | 11/1960 | Reimers.......................... | 423/555 X |
| 3,102,787 | 9/1963 | McMillan et al. ................. | 423/485 |
| 3,160,473 | 12/1964 | Hayworth et al. ................. | 423/485 |
| 3,278,265 | 10/1966 | Quarles........................... | 423/485 |
| 3,469,939 | 9/1969 | Aiso et al........................ | 423/485 |

FOREIGN PATENTS OR APPLICATIONS
661,926   4/1963   Canada.............................. 423/485

*Primary Examiner*—Edward Stern
*Attorney, Agent, or Firm*—Burgess, Dinklage & Sprung

[57] ABSTRACT

In the production of hydrogen fluoride and metal sulfates by the reaction of sulfuric acid and a metal fluoride, e.g. fluorspar, wherein the fluorspar is preheated, the improvement which comprises effecting the preheating by continuously heating the metal fluoride to about 500° to 800°C in a gas/solid suspension with a gas charge of about 0.2 to 4 kg/Nm$^3$ and then reacting the preheated metal fluoride with sulfuric acid at a temperature of about 100° to 500°C. The preheating is preferably effected in counterflow with hot combustion gases, the preheater either having alternating constricted and widened zones or allowing the fluorspar to be alternately suspended in and separated from the gas passing through the preheater. The sulfuric acid is conveniently added to the fluorspar at a plurality of points prior to entry into the main reactor. In addition, an alkaline substance such as calcium oxide or hydroxide which reacts exothermically with sulfuric acid may be added to the preheater or thereafter so as to provide additional heat for the main reaction. The sulfuric acid may contain sulfur trioxide or oleum, preferably in appropriate amount to react with the byproduct water formed from the exothermic reaction of the calcium or hydroxide.

8 Claims, 1 Drawing Figure

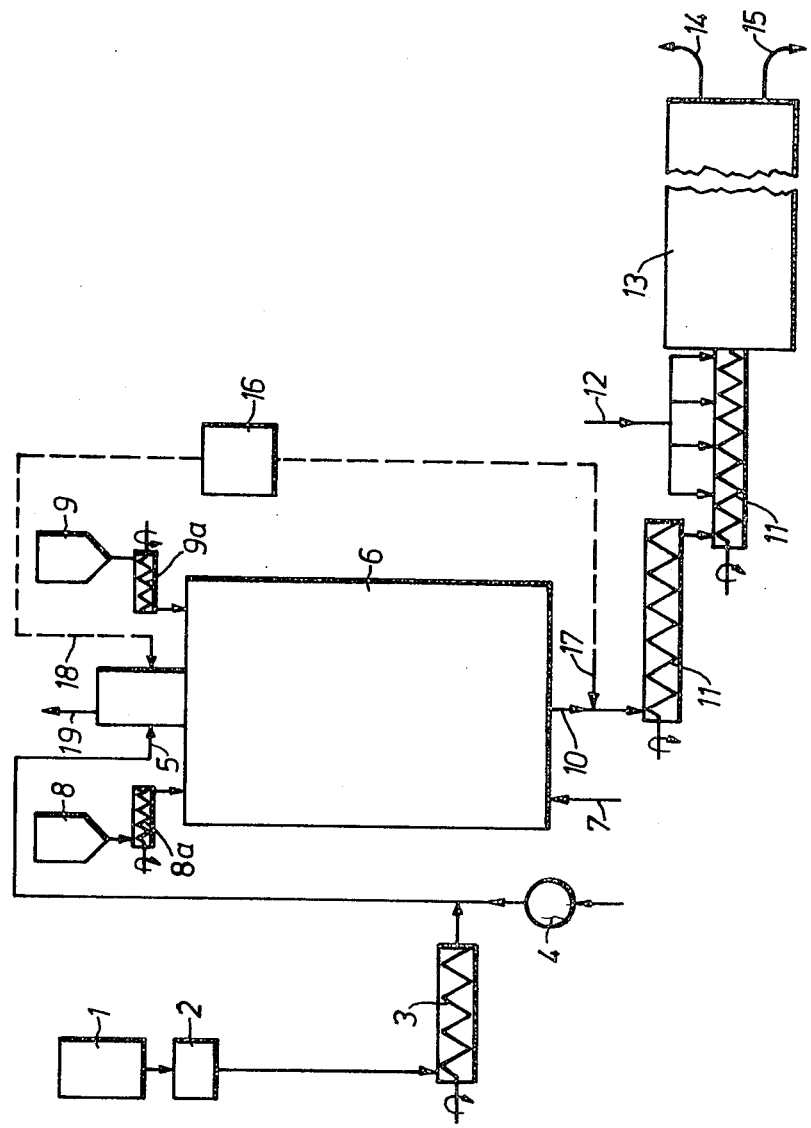

PRODUCTION OF HYDROGEN FLUORIDE

This is a continuation of application Ser. No. 219,376, filed Jan. 20, 1972 now abandoned.

This invention relates to an improved process for the production of hydrogen fluoride by reacting a metal fluoride, in particular calcium fluoride, with sulfuric acid.

It has long been known to produce hydrogen fluoride and calcium sulfate from fluorspar and sulfuric acid in an externally heated rotary furnace. In the conventional process for the production of hydrogen fluoride, the reaction between sulfuric acid and fluorspar is accompanied by the caking together of the products and the formation of lumps which give rise to trouble in the roasting furnace. The transfer of heat from the wall of the furnace to the reactants and the efficiency of the furnace are thereby considerably reduced and at the same time the apparatus becomes very liable to corrosion.

Numerous proposals have already been made to overcome this troublesome formation of lumps. Thus, for example, U.S. Pat. No. 1,748,735 describes a process in which numerous heavy iron and steel rails are introduced into the reaction zone in order to break up the lumps. These rails are lifted in the bed by special devices and then dropped down on the reacting material with considerable force. The considerable mechanical stresses thereby produced, however, give rise to rapid wear of the plant.

In U.S. Pat. No. 2,846,290 it is proposed to prevent the formation of lumps by carrying out the reaction in the presence of chlorinated benzene as a diluent. This process, however, requires the use of large quantities of solvent so that the end product obtained is correspondingly impure.

In German Pat. No. 1,245,339 aa method is disclosed to prevent the formation of lumps in the production of hydrogen fluoride from fluorspar and sulfuric acid by preheating the fluorspar to a temperature of about 425°C to 705°C. and then introducing it into the reaction zone while it is still hot.

Another problem in the production of hydrofluoric acid arises from the fact that the world output of this product is ever increasing so that the supply of pure fluorspar becomes increasingly more difficult, especially since the steel industry also uses large quantities of fluorspar. It is therefore necessary to make use of mineral sources which contain only a low percentage of fluorspar from which the fluorspar must then be concentrated by flotation to a calcium fluoride content of about 97 percent. The remaining impurities in the spar, which consist of silicon dioxide, flotation liquid, sulfide sulfur and other oxides, and the demand for ever increasing quantities of anhydrous hydrofluoric acid with a very high degree of purity make it necessary to modify the conventional rotary furnace process. The most serious impediment to the reaction is the presence of the flotation liquid because it prevents wetting of the spar with sulfuric acid. Furthermore, the progressive increase in the quantity of oxides present introduces water into the process, which also has a very disadvantageous effect.

All these factors cause reaction difficulties, severe corrosion, blockages in the attached apparatus, reduced yields and impure end products.

These problems could only be solved incompletely with the processes hitherto known for the production of hydrofluoric acid.

It is accordingly an object of the present invention to provide an improved process for the production of hydrogen fluoride which is substantially trouble free and does not rapidly wear out the apparatus.

These and other objects and advantages are realized in accordance with the present invention pursuant to which a preheated metal fluoride, especially fluorspar, is reacted with sulfuric acid at a temperature of about 100° to 500°C to produce hydrogen fluoride and a metal sulfate, especially anhydrite. The process is characterized by effecting the preheating of the metal fluoride continuously to a temperature in the range of about 500°C to 800°C, preferably in counterflow, in a gas/solid suspension charged with gas at the rate of 0.2 to 4 kg/Nm$^3$.

It has now surprisingly been found that these measures enable the solid to be heated without the formation of lumps and thus obviate numerous disadvantages which have previously always occurred in some form in the production of hydrofluoric acid. Thus, for example, this process allows for a smooth reaction between the individual reactants because the method of preheating by the process according to the invention completely dispenses with the use of troublesome flotation liquids which interfere with the reaction between fluorspar and sulfuric acid and also impair the quality of the metal sulfates, e.g. anhydrite. Furthermore, the apparatus attached to the heating furnace are now no longer contaminated with flotation liquids, the acid quality is no longer impaired by the fatty acids contained in the flotation liquid and it is now no longer necessary to distil the fluoric acid produced. A substantial improvement in quality is also obtained e.g. with the anhydrite produced. Very pure, white anhydrite is obtained which has great strength, requires little water and has a very short setting time.

The crude fluorides, which may have to be ground, have a maximum particle size of from about 40 to 250$\mu$, preferably from about 60 to 150/$\mu$. These fluorides are conveyed over suitable conveyor devices such as screws and other suitable dosing apparatus to a heat exchanger where they are brought into contact with hot gases. The heat exchange system consists of a heat exchanger and one or more cyclones connected thereto. The material which is to be heated is supplied between the heat exchanger and the cyclones and conveyed into tie cyclones by the gas stream. After being deposited in the cyclones, the material which is to be heated is introduced into the head of the heat exchanger and drops into the lower lying parts of the exchanger, preferably in counterflow to the current of gas, until it reaches the bottom of the heat exchanger. From there, the heated material passes through a downpipe into conveyor devices, e.g. heated or unheated screws. The heating gases are drawn through the heat exchanger system, e.g. by means of a ventilator. They enter the lower part of the exchanger, where they transfer their heat to the material which is to be heated, and then leave the system through the cyclones. The length of time for which the particles which are to be heated must stay in the exchanger to effect heat exchange may be influenced by adjusting the rate of flow and by the form of the exchanger. Thus, for example the exchanger may be in the form of several successive restricted and wider zones. Suitable apparatus for use as such heat exchangers have been described e.g. in German Offenlegungsschriften No. 1,442,766 published Mar. 6, 1969, and No. 1,442,782 published Mar. 20, 1969.

Instead of these apparatus there may be used a heat exchange system in which the solid material is mechanically separated and again suspended at given intervals of time and space during the passage of the gas. Such an apparatus has been described e.g. in "Zement, Kalk, Gips" 16 (1963), Volume 1, pages 1 – 8.

The metal fluorides are heated up until all the substances present in the flotation liquid, e.g. saturated and unsaturated fatty acids, have been removed, the temperature depending on the impurities present. The sulfidic sulfur present in the raw materials, e.g. in crude fluorspar, is also removed in this way. Temperatures of over 400°C are generally required for destroying these organic and inorganic substances. If preheating is carried out at temperatures over about 800°C, however, there is the risk of caking which may cause trouble. The main source of heat used for the preheating process consists of combustion gases, e. g. from burning solid, liquid or gaseous carbonaceous materials. These may be subjected to additional heating if necessary. The temperature of the heating gases on entering the preheater should be in the range of from about 500°C to 1,200°C.

The formation of large lumps should be prevented while the particles of metal fluorides are being heated up. One way of achieving this is to adjust the gas flow to a sufficiently high velocity but the concentration of particles in the resulting gas/solid suspension must be sufficiently high to result in the formation of "particle clouds." Gas charges i.e. concentrations of solids in the gas, of about 0.2 to 4 kg/Nm³ and especially about 0.4 to 1.5 kg/Nm³ have been found to be particularly suitable.

According to a particular embodiment of the process of the invention, substances which undergo highly exothermic reactions with $H_2SO_4$ or $SO_3$ with the formation of substances which are inert towards the resulting reaction products are added to the metal fluorides. Inert in this context means that neither the properties of the resulting metal sulfate are adversely influenced nor is the hydrofluoric acid contaminated. The addition of substances which liberate heat in the reaction with sulfuric acid or $SO_3$ entails considerable advantages. The reaction $$CaF_2 + H_2SO_4 \rightarrow 2HF + CaSO_4$$

is an endothermic reaction consuming 14.35 Kcal. In addition a minimum temperature of about 100°C must be maintained to ensure that the hydrofluoric acid is completely driven out of the reaction mixture. In practice, the quantity of heat required for the process is supplied to the reaction mixture by indirect heating. Transfer of heat to the reaction mixture is relatively inefficient but since the volume/time yield of a hydrofluoric acid furnace, i.e. the rate of throughput of the reaction mixture depends on the length of time during which the necessary energy can be supplied to the mixture it is necessary to apply relatively high external temperatures. This increased supply of heat results in considerable wear of the furnace, especially since the supply is effected by indirect heating. Moreover, localized overheating of the reaction mixture cannot always be prevented, and consequently the quality of the resulting metal sulfate, e.g. of the anhydrite, is impaired. It has been found that if the temperatures employed in the production of hydrofluoric acid are too high the strength which can be obtained in structural elements using the anhydrite as binder is reduced and the setting times of mortar produced with the anhydrite are also adversely affected.

The quantity of heat required to be supplied to the system from outside can be reduced in proportion to the quantity of the substances added according to the invention and the quantity of heat liberated. Consequently, either the temperature to which the system must be heated or the heating time at a given temperature may be reduced.

The additives used are advantageously calcium oxide or calcium hydroxide but other substances may also be added, e.g. HaCH, HOH, soda, potash, etc.

The quantity of additives which react exothermally with sulfuric acid or $SO_3$ may vary within fairly wide limits in proportion to the quantity of metal fluoride. Quantities of up to about 20 mole per cent may be added. In the case of calcium oxide, for example, quantities of from about 2 to 15 mole percent and preferably about 8 to 10 mole percent based on the calcium fluoride content of the fluorspar may be used. The addition of these substances may be carried out either before or after calcining of the fluorides. Since an ample supply of heat and efficient utilization of heat are generally desired during the production of hydrofluoric acid, i.e. in the reaction proper between the metal fluoride and sulfuric acid, it is advisable especially if the additives are mixed with the fluorspar in the cold, to carry out the mixing operation before the preheating stage and to calcine the additives together with the metal fluoride. In this way, an additional quantity of heat is introduced into the system and subsequent cooling of the preheated metal fluorides by the addition of cold additives is prevented. In some circumstances, however, it may be unnecessary to introduce the additives before the calcining operation, especially if the additives are available in a hot state. After leaving the preheater and after the addition of the above mentioned additives, if these are used, the hot mixture of solids, which is at a temperature of about 200°C. to 700°C, preferably about 300°C to 400°C, is conveyed to the sulfuric acid reaction in the reaction furnace proper by means of suitable devices, e.g. conveyor screws. The reaction proper is carried out at temperatures of between about 100°C and 500°C. The sulfuric acid required for this reaction may be replaced by sulfur trioxide or oleum at least to the extent that water is already present or formed in the reaction between sulfuric acid and the additives.

The sulfuric acid is preferably already added to the mixture of solids before entering the reaction furnace proper. The relatively strong endothermic reaction between metal fluorides aand sulfuric acid according to the following equation:

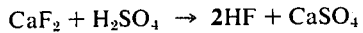
$$MeF_2 + H_2SO_4 \rightarrow 2HF + MeSO_4$$

has thereby already begun before the reaction furnace and has progressed to a considerable extent when the reactants enter the furnace. Strong external heating of the initial part of the reaction furnace can therefore be dispensed with and furthermore the front part of the reaction, which is normally the part most severely affected by corrosion in the production of hydrofluoric acid, is practically completely protected against corrosion if the reaction is carried out in this way because less free sulfuric acid is then present in this part of the furnace. The addition of sulfuric acid may be carried out in any desired way but it has been found especially advantageous to add the acid at several points instead of at only one point because the concentration of acid will then never be excessive at any point. In other words, this method of procedure prevents caking and the formation of encrustations in the conveyor device (e.g. in the screw). The mixture, which in this way becomes "lean," i.e. non-caking, on its entry into the reaction furnace does not form lumps but remains loosely pourable and can easily be kept in motion.

In the reaction furnace proper, the stream of gas may be carried in the same direction as the other reactants or in counterflow but in many cases a direct flow of gas will be preferred.

The process according to the invention may be carried out with any starting materials. Although naturally occurring metal fluorides, especially calcium fluorides (fluorspar), which are worked up in known manner, e.g. by flotation, are normally used, the process according to the invention is equally applicable to other fluorides, e.g. precipitated calcium fluoride. Further, complex fluorides such as sodium silicofluorides may also be used.

The process according to the invention will now be explained with the aid of one particular embodiment described with reference to the accompanying drawing which is a schematic flowsheet of a process and apparatus for practicing the present invention.

In the FIG. 1 is a storage container, 2 a dosing apparatus, 3 a mechanical conveyor device, 4 a pneumatic conveyor device, 5 an inlet for solids, 6 a heat exchanger, 7 an inlet for hot gases, 8 and 9 cyclones, 8a and 9a conveyor screws, 10 a discharge aperture, 11 mechanical conveyor devices, 12 the inlet for sulfuric acid, 13 a rotary furnace. 14 and 15 discharge apertures for HF and metal sulfate, respectively, 16 a storage container, 17 and 18 the points of inlet for the additives and 19 gas discharge apertures and conduits leading to the gas cooler.

Referring now more particularly to the drawing, ground fluorspar is fed into the heat exchanger 6 through an aperture 5 at the top from a storage container 1 by way of a dosing device 2 and mechanical or pneumatic conveyor devices 3 and 4. Heating is effected by means of a burner inside a heating chamber. The gases then enter the bottom of the exchanger at 7 at a temperature of about 860°C. The hot gases leave the exchanger at 19 at temperatures of between 250°C and 500°C and are then cooled in a cooler and reduced to a temperature of about 200°C with air. The gases then enter a filtering plant. The fluorspar leaves the heat exchanger at about 550°C through conveyor screws 11. A gauge glass equipped with a source of cobalt 60 at the lower end of the exchanger serves to check the outflow for the occurrence of caking. Sulfuric acid is added at 12 before introduction of the heated fluorspar into the rotary furnace 13 proper. The additives which may be added according to the invention are added to the fluorspar either at 18 before the preheating stage or at 17 after preheating.

The invention will be further described in the following illustrative examples wherein there was employed an apparatus in accordance with the drawing.

EXAMPLE 1

About 90,000 kg of fluorspar (approximately 97 percent) in 24 hours were heated to a reaction temperature of over 550°C in a counterflow heat exchanger (gas charge 1.5 kg/Nm$^3$, the heating gases having a temperature of about 900°C. The fluorspar entered an externally heated rotary furnace at a temperature of about 550°C by way of a conveyor and mixing apparatus (length of furnace approximately 20 m, diameter 2.5 m). The mixture of sulfuric acid and water was preheated together with oleum or SO$_3$ (110°C to 180°C) and introduced into the mixing apparatus. The H$_2$SO$_4$ (resulting from the above mentioned components) was added to the fluorspar in practically stoichiometric quantities. The reaction already took place to a considerable extent inside the mixer. The acid was introduced into the mixing apparatus at several points in order to prevent localized excess of sulfuric acid in the apparatus. The yield, based on fluorspar and sulfuric acid, was about 98 percent. The substance lost by calcination contained less than 1 percent of CaF$_2$ and less than 1 percent of sulfuric acid. The hydrofluoric acid obtained (without distillation) had the following composition:

| | |
|---|---|
| NF | ~99.95 % |
| H$_2$O | < 0.05 % |
| H$_2$SO$_4$ | < 0.001 % |
| SO$_2$ | < 0.01 % |

Preheating of the starting materials enabled heating of the furnace to be reduced and hence localized overheating to be prevented. It was found that the quality of the resulting anhydrite exhibited improved purity and setting time as compared with that produced by prior processes.

EXAMPLE 2

The conditions mentioned in Example 1 were employed. About 3 percent by weight of CaO, based on the quantity of fluorspar supplied to the process, were added to the fluorspar via the preheater in order to assist the reaction in the mixing apparatus for various reasons (heat supply among others). A stoichiometric quantity of SO$_3$ or oleum, based on this quantity of CaO, was also introduced into the mixing apparatus. External heating of the furnace could be still further reduced by the addition of CaO.

EXAMPLE 3

About 10 percent by weight of CaO was added to the fluorspar via the preheater under the conditions mentioned in Example 1 in order to improve the heat control in the furnace. The quantity of H$_2$SO$_4$ required for the reaction with CaF$_2$ and the quantity of SO$_3$ or oleum required for the reaction with CaO were introduced into a mixing apparatus in the same way as in Example 1. The quantity of heat produced in the reaction between CaO and SO$_3$ is sufficient to convert the endothermic reaction between CaF$_2$ and H$_2$SO$_4$ (approximately 36,000 Kcal per 100 kg of NF produced) into a distinctly exothermic reaction (approximately 14,000 Kcal per 100 kg of HF produced).

EXAMPLE 4

Using the same conditions as described in Example 1 and the same procedure, sodium silicofluoride instead of fluorspar is reacted with the stoichiometric quantity of $H_2SO_4$. In this case, the temperature in the preheater must not exceed the decomposition temperature of sodium silicofluoride. The temperature of the material in the heat exchanger therefore must not exceed 600°C. The $SiF_4$ produced in the subsequent reaction was reacted with water in a hydrolytic apparatus to produce hexafluorosilicic acid and $SiO_2$ according to the following equation $$3\ SiF_4 + 2\ H_2O \rightarrow 2\ H_2SiF_6 + SiO_2.$$

The $SiO_2$ is filtered off. The hexafluorosilicic acid may be used e.g. for the production of fluorides.

It will be appreciated that the instant specification and examples are set forth by way of illustration and not limitation, and that various modifications and changes may be made without departing from the spirit and scope of the present invention.

What is claimed is:

1. In the production of hydrogen fluoride and metal sulfates by reacting sulfuric acid with a preheated metal fluoride, the improvement which comprises effecting the preheating by continuously heating the metal fluoride to about 500° to 800°C in a gas/solid suspension with a gas charge of about 0.2 to 4 kg/$Nm^3$, the preheating being effected by directly contacting the metal fluoride in counterflow with a hot gas of a temperature from about 500° to 1,200°C in a heat exchanger having alternating constricted and widened zones thereby to form localized clouds of particles, and then reacting the preheated metal fluoride with sulfuric acid at a temperature of about 100° to 500°C.

2. Process according to claim 1, wherein the preheating of the metal floride is carried out in a heat exchanger in which the suspended solid after being partially preheated by the gas is mechanically separated from the gas during its passage through heat exchanger and is thereafter resuspended in gas.

3. Process according to claim 1, wherein the metal fluoride comprises fluorspar.

4. Process according to claim 1, wherein there is added to the metal fluoride during preheating or subsequent thereto prior to the reaction with sulfuric acid a substance which reacts exothermically with sulfuric acid or sulfur trioxide, whereby the heat of reaction provides heat for the reaction between the sulfuric acid and metal fluoride.

5. Process according to claim 4, wherein the sulfuric acid contains sulfur trioxide or oleum in approximately the quantity needed to form sulfuric acid with the water formed by the exothermic reaction of said substance with sulfuric acid.

6. Process according to claim 4, wherein the substance comprises calcium oxide or calcium hydroxide added in about 2 to 15 mole per cent based on the metal fluoride.

7. Process according to claim 1, wherein the sulfuric acid is added to the metal fluoride prior to their introduction into a reactor wherein the main reaction proceeds.

8. Process according to claim 5, wherein the metal fluoride comprises fluorspar and the added substance comprises calcium oxide, calcium hydroxide, sodium hydroxide, potassium hydroxide, soda or potash added in about 2 to 15 mole per cent based on the fluorspar, the sulfuric acid being added to the fluorspar in a plurality of increments prior to their introduction into said reactor.

* * * * *